United States Patent [19]
Cudahy et al.

[11] 3,905,364
[45] Sept. 16, 1975

[54] ARTIFACT DETECTOR

[75] Inventors: Michael J. Cudahy, Nashota; Robert D. Sherwood, Wauwatosa, both of Wis.

[73] Assignee: Marquette Electronics, Inc., Milwaukee, Wis.

[22] Filed: Apr. 17, 1974

[21] Appl. No.: 461,610

[52] U.S. Cl. ......... 128/2.06 R; 324/103 R; 328/137; 328/147; 328/148; 328/149;
[51] Int. Cl.² ............ A61B 5/04 340/253 Z; 340/414
[58] Field of Search ..... 128/2.05 R, 2.05 T, 2.06 A, 128/2.06 B, 2.06 E, 2.06 F, 2.06 G, 2.06 R, 128/2.06 V, 2.06 A, 2.1 B, 2.1 R; 340/414, 340/253 R, 253 M, 253 Y, 253 Z; 324/103 R; 328/117, 118, 139, 147, 148, 149, 154

[56] References Cited
UNITED STATES PATENTS

| 3,052,841 | 9/1962 | Nanderberg | 324/131 |
|---|---|---|---|
| 3,228,391 | 1/1966 | Fitter et al. | 128/2.05 T |
| 3,520,295 | 7/1970 | Kelly | 128/2.06 R |
| 3,552,386 | 1/1971 | Horth | 128/2.06 A |
| 3,559,193 | 1/1971 | Savaglio et al. | 128/2.06 B |
| 3,757,778 | 9/1973 | Graham | 128/2.06 R |
| 3,760,796 | 9/1973 | Baessler et al. | 128/2.1 B |

*Primary Examiner*—William E. Kamm
*Attorney, Agent, or Firm*—Andrus, Sceales, Starke & Sawall

[57] ABSTRACT

A detector for ascertaining the presence of artifacts in electrocardiographic data includes a.c. artifact detector circuitry and d.c. artifact detector circuitry coupled in parallel to positive and negative diode banks. The diode banks provide the largest magnitude positive and negative artifact signals to comparison circuitry comprised of a pair of diodes which selects the largest of the positive or negative signals for application to an indicating meter. The detector also includes capacitive means for limiting deflection of the meter during the QRS complex signals of the data and means for rapidly discharging the capacitor at the conclusion of such signals.

17 Claims, 22 Drawing Figures

ARTIFACT DETECTOR

BACKGROUND OF THE INVENTION

1. Field of the Invention

The present invention relates to circuitry for detecting spurious signals, termed "artifacts", in electrocardiographic data.

2. Description of the Prior Art

Among recent advances in electrocardiography is the transmission of electrocardiographic data over telephone lines for remote analysis by a cardiologist or for storage in a computer. In such data transmission, an input amplifier amplifies the electrical signals received from electrodes placed on the patient in a prescribed pattern. The amplifier provides the electrocardiographic data to a telephone coupler which feeds the amplified data onto the telephone lines.

In order to fully utilize electrocardiographic data transmission techniques, it is necessary to insure that the data being transmitted is without flaws, termed artifacts, which lessen or defeat its utility for diagnostic purposes. In some cases the data acquisition equipment includes means for producing an electrocardiogram at the same time the data is transmitted. If correctly interpreted by a trained technician, this will suffice to ascertain the presence or absence of artifacts in the transmitted data. However, in many cases, such an electrocardiogram is not required and the addition of a writing recorder or cathode ray tube to the data acquisition circuitry solely to ascertain the quality of the data is quite costly.

SUMMARY OF THE PRESENT INVENTION

It is, therefore, the object of the present invention to provide a means for ascertaining whether transmitted electrocardiographic data contains artifacts. A feature of the present invention is its ability to detect, and indicate the presence of small magnitude periodic artifacts while being relatively insensitive to the large magnitude electrocardiographic phenomena which are also periodic in nature.

The present invention thus obviates the need for paper recorders or cathode ray tubes to detect artifacts. If such flaws are present, the present invention indicates whether they are of a magnitude which renders the electrocardiographic data medically unusable by an objective indication of the quality, such as "Good", "Marginal", or "Bad". Such indication permits operation of the data acquisition circuitry by persons untrained in the interpretation of electrocardiograms. Should an artifact exist in the data the artifact detector also suggests, by its operation, the type of artifact present, thereby facilitating remedial action.

In summary, the artifact detector of the present invention includes an a.c. detector section for detecting a.c. artifacts and a d.c. detector section for detecting d.c. artifacts connected in parallel to a source of electrocardiographic data. The a.c. detector section includes a saturable amplifier and a band pass filter having a frequency response suitable for passing a.c. artifact frequencies. The d.c. detector section includes an amplifier having d.c. response. One pair of such circuitries is employed for each channel of electrocardiographic data to be monitored.

The outputs of the a.c. detector sections and the d.c. detector sections are connected in parallel to positive and negative diode banks which pass the largest positive and negative signals existing at any given time to their outputs. These positive and negative signals are provided to a smoothing circuit which smooths any signals which are periodic in nature. The smoothed signals are provided to a comparison means which provides a unipolarity signal corresponding to the largest positive or negative signal generated in the detector circuitries and diode banks. The unipolarity output signal is provided to a resistor-capacitor circuit and to an indicating means such as a meter for indicating the presence or absence of artifacts. The capacitor serves to reduce undesirable deflection of the indicating means during the QRS signal complex of the electrocardiographic signal. A timer operated discharge means is provided to rapidly discharge the capacitor at the conclusion of the QRS complex signal so as to further reduce undesired deflection of the meter.

DESCRIPTION OF THE PREFERRED EMBODIMENT

Electrocardiographic Artifacts

Electrocardiographic employs the rhythmic electrical signals generated on the surface of the skin by the physiological functioning of the heart as a diagnostic tool. Such signals include the QRS wave or complex, preceded by the P wave and succeeded by the T wave. The QRS complex typically generates a signal of approximately 1 millivolt or more. A typical heartbeat rate is 72 beats per minute so that the frequency of the electrocardiographic signal is 1.2 Hz.

Defective electrocardiographic data is usually due to four major flaws or artifacts, two of which produce d.c. phenomena in the electrocardiographic data and two of which produce a.c. phenomena. One type of d.c. artifact is produced by a faulty or missing electrode connection which substantially lessens, or prevents generation of, the electrical signal from the patient. A second d.c. artifact is base line drift by which the d.c. level of the electrocardiographic data changes with time. If the amount of drift is great enough and/or the time period short enough the signal may drift out of the operating range of the amplifier in the data acquisition circuitry or off scale on the recorder. This deviation is due to variations in the electrolytic properties of the electrode connection to the patient. Electrocardiographic data may be unacceptable if base line drift exceeds 1 millivolt in 5 seconds.

A. c. artifacts include muscle tremor in the patient which, if of sufficient magnitude, may obscure certain portions of the cyclical cardiac signal, typically the Q or S waves or deflections of the QRS signal complex, and sometimes the preceding and succeeding P and T deflections. Muscle tremor is typically 10 to 40 Hz in frequency. Electrical interferences resulting from the 50/60 Hz power supply line also obscures small magnitude electrocardiograph signals. Electrocardiograph data may be unacceptable if either of these a.c. artifacts exceed 0.1 millivolt peak to peak.

Electrocardiograph Data Transmission Circuit

Figure 1:
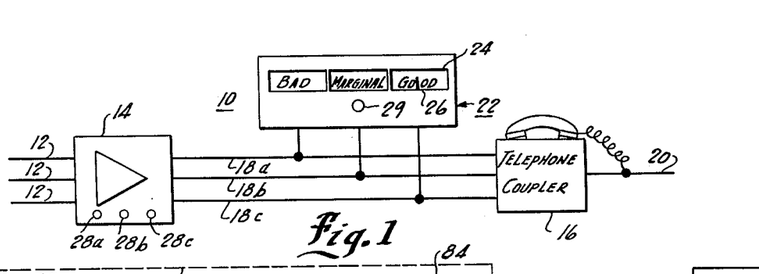
FIG. 1 is a block diagram of electrocardiographic data transmission circuitry containing the artifact detector of the present invention.

Turning now to FIG. 1, there is shown therein an electrocardiographic data transmission circuit 10 containing means for detecting artifacts in the electrocardiographic data undergoing transmission. The transmission circuitry obtains electrocardiographic data from leads 12 which are attached to the patient. The number of electrodes and leads employed may vary depending on the type and amount of physiological data desired. A sufficient number of electrodes and leads are commonly utilized to obtain three simultaneous electrocardiographic signals indicating the electric potentials produced by the patient's heart at various parts of the body. These are usually the three standard bipolar leads commonly termed I, II, and III; the first three unipolar, precordial leads commonly termed $V_1$, $V_2$, and $V_3$; and the second three unipolar, precordial leads, $V_4$, $V_5$, and $V_6$. Three signal paths termed "channels", are provided in the electrocardiographic circuit to transmit the three simultaneously generated electrocardiographic signals.

The electrocardiographic data applied to electrocardiographic circuit 10 are provided to input amplification circuitry 14. Such amplification circuitry typically includes differential amplifier circuitry and may be that described in U.S. Pat. No. 3,580,243 assigned to the assignee of the present application. Switches 28a, 28b, and 28c may be used to select the lead groupings, for example, standard bipolar, first unipolar precordial, and second unipolar precordial, respectively.

The output of amplification circuitry 14 is provided to telephone coupler 16 in conductors 18a, 18b, and 18c. Telephone coupler 16 may provide the modulation necessary for telephonic transmission by introducing a carrier having a distinguishing or differentiating characteristic into each of the three electrocardiographic signals so that the three signals may be transmitted over a single telephone line. Many modulation techniques may be utilized such as amplitude modulation, pulse width modulation, etc., with frequency modulation being most commonly employed. For this purpose, the modulation may be carried out by voltage controlled oscillators.

Telephone coupler 16 may also include any filter or wave shaping circuits necessary to insure that the data in the three data channels is suitable for telephonic transmission. The output of telephone coupler 16 is provided to telephone line 20.

The Artifact Detector

To ascertain whether artifacts exist in the electrocardiographic data to be transmitted over telephone line 20, artifact detector 22 is connected to conductors 18a, 18b, and 18c. Artifact detector 22 includes meter 24 having pointer 26, the deflection of which indicates the presence or absence of artifacts in the electrocardiographic data. For ease in determining the presence or absence of artifacts, and the corresponding quality of the data, the meter scale may be divided into three sectors "Good, Marginal, and Bad". Artifact detector 22 also includes switch 29 which enables the operator to sample the data existing in conductors 18a, 18b, and 18c.

Figure 2:
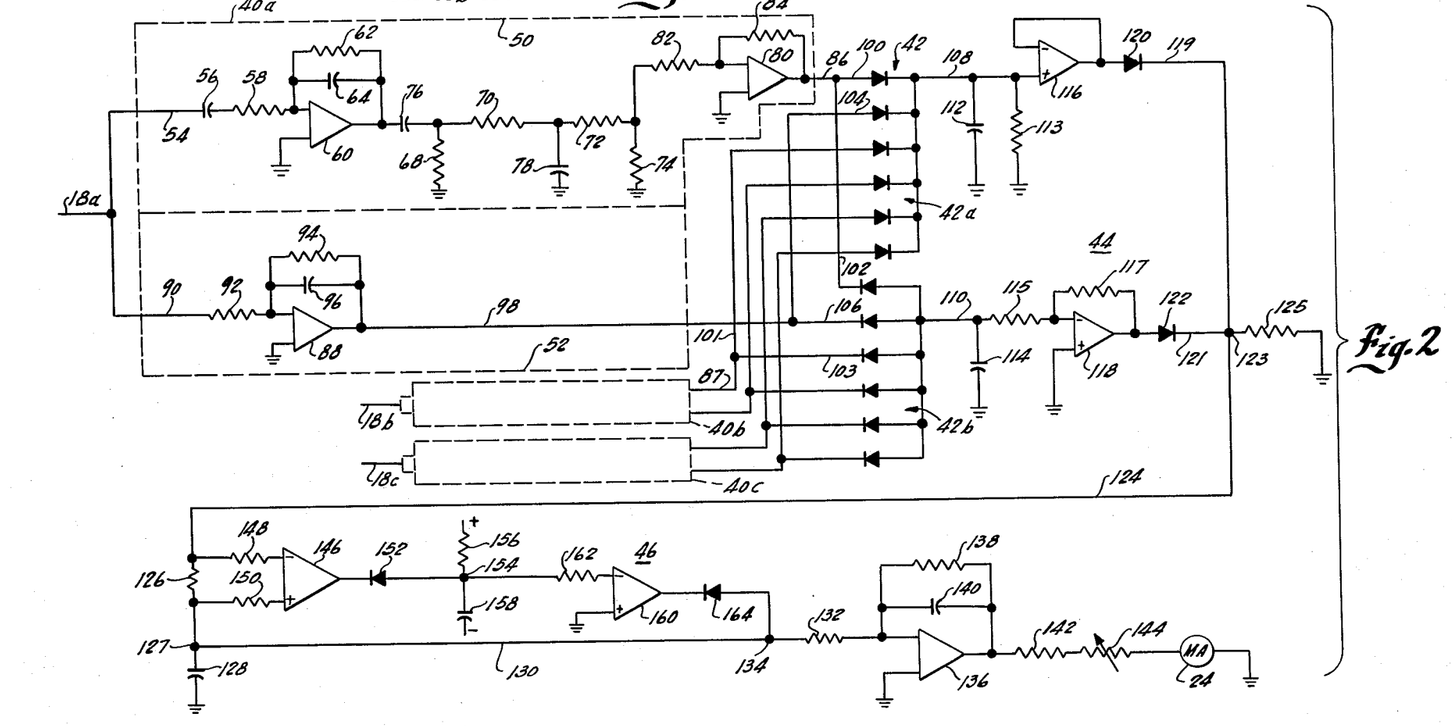
FIG. 2 is a detailed schematic diagraph of the circuitry of the artifact detector.

As shown in FIG. 2 and as hereinafter described in detail, artifact detector 22 includes artifact detection circuitry coupled to each of conductors 18 in the data acquisition circuitry for ascertaining the presence of artifacts in the amplified data received from the patient. For example, artifact detection circuit 40a may be connected to conductor 18a, artifact detection circuitry 40b connected to conductor 18b, and artifact detection circuit 40c connected to conductor 18c. For clarity, only the artifact detection circuitry 40a for detecting artifacts in the data present in conductor 18a is shown in detail, the similar circuitry coupled to conductors 18b and 18c being shown by blocks 40b and 40c.

The output signals from artifact detection circuits 40a, 40b, and 40c are provided to diode bank 42 which mixes and isolates the various artifact signals obtained by the three detection circuits. The output of diode bank 42 is smoothed and applied to conversion or selection circuitry 44 which provides a unipolarity output signal having a magnitude corresponding to artifacts present in the data to meter driver circuitry 46. Meter driver circuitry 46 provides a signal suitable for operating meter 24 which indicates the presence and extent of artifacts in the electrocardiographic data.

Artifact Detection Circuitry

Artifact detection circuit 40a includes an a.c. detector section 50 for detecting the muscle tremor and 50/60 Hz interference artifacts which produce periodic or a.c. phenomena in the electrocardiographic data. Artifact detection circuit 40a also includes a d.c. detector section 52 for detecting the electrode off and base line drift artifacts which produce d.c. phenomena. The detector sections are connected in parallel to conductor 18a. The construction of these circuits takes into account the fact that d.c. artifacts, for example, base line drift, may be many times larger in magnitude than a.c. artifacts before the electrocardiographic data becomes unusable. Thus, artifact detector 22 may indicate that the electrocardiographic data is unacceptable, as by the appropriate deflection in meter 24, if d.c. drift exceeds more than 1 millivolt in 5 second. For a.c. artifactss, the data artifacts, indicated as unacceptable if the a.c. artifact exceeds 0.1 millivolt peak to peak. This difference in signal levels between a.c. and d.c. artifacts is accounted for by the levels of amplification in a.c. detector section 50 and d.c. detector section 52 of artifact detection circuit 40a.

A.c. detector section 50 includes input conductor 54 connected to conductor 18a. Conductor 54 contains capacitor 56 which serves to isolate a.c. detector section from d.c. detector section 52 because of the higher gain of the former. Conductor 54 also contains input resistor 58 for amplifier 60. Amplifier 60 may be a differential input, high gain amplifier, commonly termed an "operational" amplifier. The feedback path of operational amplifier 60 includes a gain controlling resistor 62 and a signal smoothing and stabilizing capacitor 64.

The relative magnitudes of input resistor 58 and feedback resistor 62, and the gain of operational amplifier 60, are selected so that the saturation of the amplifier clips the top of the QRS complex of the electrocardiographic signal. This clipping action avoids severe deflection of meter 24 by the QRS complexes which are many times greater in magnitude than the a.c. artifacts. The saturation of amplifier 60 typically occurs at a signal at the patient of 0.2 millivolts peak to peak. An artifact signal of this magnitude will drive meter 24 full scale.

The output of operational amplifier 60 is provided to R - C filter containing resistors 68, 70, 72, and 74 and capacitors 76 and 78. The magnitudes of these resistors and capacitors are selected to provide a band pass frequency response characteristic to a.c. detector section 50 which peaks at 30 Hz. The band is approximately 10 Hz to 60 Hz as established by the three dB points on either side of the peak. Inasmuch as muscle tremor artifacts exhibit a frequency of about 10 to 40 Hz, operational amplifier 60 is highly responsive to these artifacts. The 60 Hz 3dB point is sufficient to enable a.c. detector section 50 to respond to 50/60 Hz interference artifacts while avoiding response to modulation carriers or other spurious high frequency signals. The low frequency cutoff of 10 Hz serves to further isolate a.c. detector section 50 from d.c. phenomena.

The output of the R - C filter is provided to a second operational amplifier 80 through input resistor 82. Operational amplifier 80 includes feedback resistor 84. Operational amplifier 80 adjusts the gain of a.c. detector section 50 to the desired level and provides an impedance match to diode banks 42. The a.c. gain of detector section 50 is frequency dependent but is typically in the area of 80 to 100 to 1. The output signal of a.c. detector section 50 is provided in conductor 86.

D.c. detector section 52 includes operational amplifier 88 connected to input conductor 90 and having input resistor 92 in its input. Feedback resistor 94 and capacitor 96 are connected in parallel in the feedback path of amplifier 88 to control its gain and to limit its frequency response to a low level, for example, 1 Hz. The gain of amplifier 88 is typically 4 or 5 to 1. The output signal of d.c. detector section 52 is provided in conductor 98.

The construction and operation of artifact detection circuits 40b and 40c are similar to that of artifact detection circuit 40a described above.

Diode Banks

The output signals of artifact detection circuits 40a, 40b, and 40c are connected in parallel to diode bank 42 containing two banks of oppositely poled diodes 42a and 42b, hereinafter identified as the positive and negative banks, respectively. Diode banks 42a and 42b provide a means for mixing the output signals of artifact detection circuits 40a, 40b, and 40c, for splitting a.c. artifact signals into positive and negative half cycle or portion signals, and for providing the largest magnitude positive and negative signals received from the various artifact detection circuits to remaining portions of the circuit. This selection is accomplished by the reverse voltage blocking characteristic of the diodes. The largest signal applied to one of the diodes in the bank reverses biases all other diodes in that bank thereby providing the desired selection function.

The output of a.c. detector section 50 of artifact detection circuit 40a in conductor 86 is connected to one diode in each of positive diode bank 42a and negative diode bank 42b by conductors 100 and 102, respectively. The output signal of d.c. detector section 52 in conductor 98 is also connected to a diode in each of the diode banks 42a and 42b by conductors 104 and 106, respectively. The output signals of the a.c. and d.c. detector sections of artifact detection circuits 40b and 40c are connected in a similar manner to the remaining diodes of the diode banks.

The outputs of diode banks 42a and 42b are provided in conductors 108 and 110, respectively, to a smoothing circuit including capacitor 112 and resistor 113 connected to conductor 108 and diode bank 42a and capacitor 114 connected to conductor 110 and diode bank 42b. The capacitors smooth the positive and negative half cycle signals of diode banks 42a and 42b in conductors 108 and 110. The smoothing provided by this circuitry aids in the selection function of the diode banks by preventing artifact detector 22 from responding to smaller d.c. or a.c. signals between the half cycles of the largest magnitude a.c. artifact signal.

Comparison Circuit

Operational amplifiers 116 and 118 of comparison circuit 44 are connected to conductors 108 and 110, respectively. They provide impedance matching to a signal comparison and selection means comprised of diodes 120 and 122 in conductors 119 and 121. Operational amplifiers 116 and 118 may operate at unity gain as by the selection of resistors 115 and 117, in connection with the latter. Operational amplifier 118 also provides signal inversion. Resistor 125 connected to the junction 123 of conductors 119 and 121 provides the small current level necessary to the satisfactory operation of diodes 120 and 122. Diode banks 42 and comparison circuit 44 may collectively be called the "conversion means".

The diode means compare the magnitudes of the positive and negative signals from diode banks 42a and 42b and provide the largest of the two signals to meter driver circuit 46 in conductor 124. This occurs by the blocking action of diodes 120 and 122. The largest magnitude output signal from either operational amplifier 116 or 118 blocks the output of the other amplifier by virtue of the reverse voltage applied to diode 120 and 122.

Meter Driver Circuit

Meter driver circuit 46 includes a series connected resistor 126 and capacitor 128 interposed in conductor 124. The lower plate of capacitor 128 is grounded. The upper plate of capacitor 128 is connected to one end of conductor 130 which is joined to conductor 124 intermediate resistor 126 and capacitor 128 at junction 127. The other end of conductor 130 is connected to resistor 132 at junction 134 and to the input of operational amplifier 136. Operational amplifier 136 provides driving current to meter 24 and includes parallel connected resistor 138 and capacitor 140 in the feedback path thereof. The output of operational amplifier 136 is connected through resistor 142 and variable resistor 144 to meter 24.

Conductor 130 is paralleled between conductor 124 and junction 134 by a timed discharge circuit for capacitor 128. Differential or operational amplifier 146 is connected across resistor 126. The negative input of amplifier 146 is connected through resistor 148 to the upper end of resistor 126. The positive input of amplifier 146 is connected through resistor 150 to the lower end of resistor 126. As no feedback path is associated with differential amplifier 146, its high gain characteristics will place the amplifier in positive or negative saturation depending on the polarity of a small magnitude input signal.

The cathode of diode 152 is connected to the output of operational amplifier 146. The anode of diode 152 is connected to junction 154.

Resistor 156 is connected between junction 154 and a positive voltage source having a magnitude equal to the positive saturated output of operational amplifier 146. Capacitor 158 is connected between junction 154 and a negative voltage source equal in magnitude to the negative saturated output of operational amplifier 146. Resistor 156 and capacitor 158 form an R - C timing circuit.

Junction 154 is connected to the negative input of differential amplifier 160 through resistor 162. The positive input of differential amplifier 160 is grounded. The absence of a feedback signal causes operational amplifier 160 to operate in either the positive or negative saturated condition. Diode 164 has its cathode connected to the output of operational amplifier 160 and its anode connected to junction 134.

Meter 24 may be of conventional configuration and type. Because the incorporation of artifact detector 22 in data acquisition circuit 10 enables the equipment to be used by relatively untrained operators, it is deemed desirable to have needle 26 at the right hand end of the scale when conditions are satisfactory, i.e. when no artifacts are present. This is by analogy to automobile gas gauges and other commonly encountered indicators which tend to read right for satisfactory conditions. Since, in the absence of artifacts there is little or no signal to meter 24, the desired right hand reading may be accomplished by turning a conventional meter upside down so that the 0 milliampere end of the scale is at the right rather than the left side. FIG. 1 shows an edge reading meter in this configuration. A dial meter may be similarly employed. In the following description of the operation of artifact detector 22, a "downscale" deflection of needle 26 is deemed to be toward "Bad" and an "upscale" deflection toward "Good".

Operation

The following parameters may be established for the operation of artifact detector 22. Amplifier circuitry 14 of electrocardiographic data transmission circuit 10 may be assumed to provide a gain of 1,000 to the patient electrocardiographic signals in supplying the signals to the input of the artifact detector. A voltage of 8 volts applied to meter 24 will result in full downscale deflection of the meter. The output of differential amplifiers 146 and 164 are assumed to swing between + and −12 volts. The upper end of resistor 156 is biased at +12 volts. The lower end of capacitor 158 is biased at −12 volts.

Without Artifacts Present

The operation of artifact detector 22 in the absence of artifacts and with only the electrocardiographic signal of the data present is as follows. The major phenomenon of the electrocardiographic signal is the large magnitude QRS signal complex which may be + 1 millivolt or more in magnitude at its peak, and 40 to 100 milliseconds in duration.

This QRS signal complex is amplified by amplification circuitry 14 in electrocardiographic data transmission circuit 10 to a signal of about + 1 volt in conductor 18a. Because of the transient or periodic nature of the QRS complex, it is applied to a.c. detector section 50. As noted supra, the gain of amplifier 60 is adjusted to saturate at electrocardiographic signal levels of 0.2 millivolts peak to peak or 0.2 volts peak to peak in the signal from amplifier circuitry 14 in conductor 18a. Inasmuch as the QRS complex is essentially a unipolarity positive signal, operational amplifier 60 saturates at a positive 0.1 volt. This provides a positive output signal 300 of 8 volts from a.c. detector section 50 in conductor 86. See FIG. 3a.

The positive signal in conductor 86 is passed through positive diode bank 42a in conductor 100 to conductor 108. The diode of negative diode bank 42b in conductor 102 is reversed bias by the positive voltage. The positive signal in conductor 108 is passed through operational amplifier 116 at unity gain, diode 120, conductor 119, and junction 123 to conductor 124. No signal appears from operational amplifier 118 and diode 122 because of the reverse bias of negative diode bank 42b and because of the reverse bias of diode 122 by the positive signal from amplifier 116 at junction 123. The output signal in conductor 124 is also the +8 volts square wave 300 in FIG. 3a having a duration of 40 to 100 milliseconds.

Figure 3A:
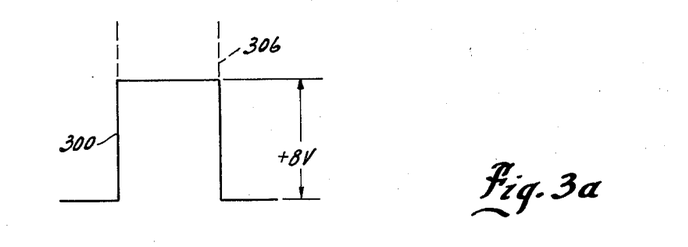
FIGS. 3a, b, and c are wave forms showing the operation of the artifact detector during the QRS complex of the electrocardiograph signal and in the absence of artifacts.

Signal 300 in conductor 124 is applied to the RC circuit consisting of resistor 126 and capacitor 128. Capacitor 128 commences to charge at a rate determined by the RC time constant to provide signal 302 at junction 127 and in conductor 130. The signal in conductor 130 is applied to junction 134, operational amplifier 136, and meter 24. Signal 302 causes a downscale deflection of the meter. This downscale deflection produced by the QRS complex is, of course undesirable since it may obscure meter deflection caused by artifacts appearing in the electrocardiographic data. The problem is further worsened by the prolonged discharge 304 of capacitor 128 through resistor 126 at the conclusion of the QRS complex and the correspondingly prolonged deflection of meter 24.

While the electro-mechanical inertia of meter 24 dampens or lessens meter deflection due to QRS signals, artifact detector 22 of the present invention uses the following additional techniques to reduce deflection of meter 24 by the QRS signal complex. First and as noted above, the voltage applied to the resistor 126—capacitor 128 circuit is limited by the saturation of operational amplifier 60 in a.c. detector section 50 which clips off the top 306 of the QRS complex signal. This clipping action reduces the charge accumulated on capacitor 128 during the time interval of the QRS complex in comparison to that which would be encountered if the greater voltage of the unclipped QRS signals were applied to the capacitor. Second, the magnitude of the resistance and capacitance of resistor 126—capacitor 128 circuitry is selected to provide a long time constant to the circuitry. This also reduces the voltage to which the capacitive charges, but at the expense of prolonging the discharge of the capacitor. If a high degree of capacitive smoothing is employed, capacitor 128 charges during the signal levels in conductor 124 produced by the QRS complex but never fully discharges to the original level between cardiac cycles so that the signal applied to meter 24 is excessive. The resulting downscale deflection of needle 26 may give false "Marginal" or "Bad" readings.

To further improve the operation of artifact detector 22 during the application of QRS signals, circuitry is provided to reduce the discharge time constant of capacitor 128 at the conclusion of the QRS signal so that the capacitor rapidly returns to its original condition. This greatly reduces the magnitude and duration of the signal applied to the meter and hence its deflection.

To reduce the discharge time constant of capacitor 128, the differential ampifier circuitry 146–160 is employed to provide a low resistance discharge path. The operation of this differential amplifier circuitry is as follows.

In the absence of a QRS signal, that is, under steady state conditions, a slight leakage current flows in conductor 124 through resistor 126 to ground. This current causes a small voltage to appear across resistor 126, positive at the top of the resistor and negative at the bottom. This voltage is sufficient to drive differential amplifier 146 into saturation. Inasmuch as a positive voltage is applied to the negative input of the amplifier, the amplifier is driven into the negative saturated condition so that a −12 volts appears at the output of differential amplifier 146.

Resistor 156 and capacitor 158 comprise a timing circuit which is particularly necessary to the operation of the circuitry when a.c. artifacts appear in conjunction with the electrocardiographic signal. While the circuitry becomes operative absence of such a.c. artifacts its timing function is not necessary to satisfactory operation of the detector artifact.

The lower plate of capacitor 158 is connected to a source of −12 volts potential. As the upper plate of capacitor 162 is biased with the −12 volts potential appearing at the output of differential amplifier 146, there is no potential across, or charge on, capacitor 158. The −12 volts output of differential amplifier 146, when applied to input resistor 162, causes a positive 12 volt signal to appear at the output of amplifier 160. This back biases diode 164 so that no conduction path axists through the diode.

When a QRS complex signal 300 appears on conductor 124, capacitor 128 commences to charge along the voltage characteristic 302. This increases the voltage across resistor 126 but does not alter its polarity. The operation of differential amplifiers 146 and 160 is not altered and the signal 302 is applied to meter 24.

Figure 3B:
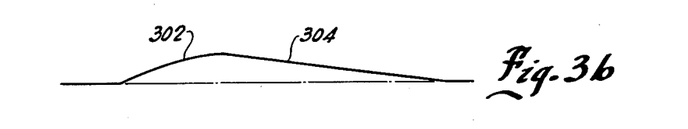
Figure 3C:
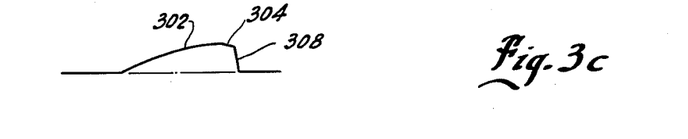

At the conclusion of the QRS complex, the signal 300 in conductor 124 is reduced. This causes capacitor 128 to commence to discharge along the voltage characteristic 304 shown in FIGS. 3b and c. The discharge current of capacitor 128 reverses the polarity of the voltage across resistor 126. The output of differential amplifier 146 now changes to the positive saturated condition, due to the reversal of the input voltage polarity. This back biases diode 152 so that differential amplifier 146 has no further effect on the operation of the circuit.

Capacitor 158 commences to charge by the current supplied through resistor 156. The potential on the upper plate of capacitor 158 rises from a −12 volts toward zero. When the voltage on the upper plate of capacitor 162 becomes slightly positive, the polarity of the signal applied to the negative input of differential amplifier 164 reverses. This reverses the polarity of the output signal of differential amplifier 160 placing it at −12 volts potential. Diode 164 is now rendered conductive so that a low resistance discharge path for capacitor 128 is provided through conductor 130, diode 164, operational amplifier 160 to ground. The low resistance characteristics of operational amplifier 160 are typical of this type of amplifier. The commercially available operational amplifier identified by the designation 301 of the National Semiconductor Corp., Santa Clara, California is suitable for use as amplifier 160 as well as for the other amplifiers of artifact detector 22.

This low resistance discharge path rapidly discharges capacitor 128 back to the potential existing in conductor 124 along voltage characteristic 308 as shown in FIG. 3c. The small energization of meter 24 provided by the voltage 302, 304, and 308 reduces to a minimum the amount of deflection of meter 24 caused by the QRS complex. The time interval during which signal 304 exists in conductor 130 is determined by the time needed to charge capacitor 158 from −12 volts to a slightly positive voltage. This interval has been exaggerated in FIG. 3c.

To facilitate the explanation, the following treats the operation of artifact detector 22 in detecting artifacts independently of the above described operation of the detector responsive to the electrocardiographic signal. It will be appreciated however that the signals do, in actuality, occur together.

In the Presence of D.C. Artifacts

The operation of artifact detector 22 to detect the artifact produced by a missing or defective patient electrode is as follows. An electrode off condition provides an infinite signal difference at the input of the differential amplifier in amplification circuitry 14 in electrocardiographic data transmission circuit 10. This causes the saturated amplifier condition output signal to appear in conductor 18a. This is typically a two volt input signal. A signal of this magnitude applied to d.c. detector section 52, by the operation of switch 29, drives operational amplifier 88 into saturation providing a signal of, for example, +8 volts in conductor 98. The positive voltage signal is conducted through diode bank 42a to conductor 108. Diode bank 42b is blocked by the positive voltage. The signal in conductor 108 is passed through amplifier 116 at unity gain, diode 120, and conductor 119 to junction 123. The smoothing provided by capacitor 112 is not required in this instance because of the d.c. nature of the signal. The +8 volts signal at junction 123 is applied to conductors 124 and 130, amplifier 136 and meter 24 to deflect the meter full scale, giving a reading of "Bad" to the technician transmitting the electrocardiographic data.

Should a negative voltage be provided in conductor 18a, operational amplifier 88 provides a negative output signal. This is passed by negative diode bank 42b to operational amplifier 118 where it is inverted for provision to conductor 124 as a positive voltage signal. The output signal from operational amplifier 118 bb_cks the output of amplifier 116 by virtue of the reverse voltage applied to diode 120 in conductor 119.

Under electrode off conditions, needle 26 immediately deflects to the "Bad" scale sector of meter 24 as soon as switch 29 is operated. This immediate deflection is an indication to the technician that a missing electrode is probably causing the artifact condition.

The circuitry of amplifier 146 and amplifier 160 is not employed responsive to artifacts producing d.c. phenomena such as electrode off conditions. The voltage across resistor 126 is plus at the top of the resistor and minus at the bottom. This provides a negative output signal from amplifier 146 to amplifier 160 and a positive output from amplifier 160. This positive signal reverse biases diode 164 and prevents the application of any signal to junction 134.

Under base line drift conditions, the operation of artifact detector 22 is similar. Assume the d.c. base line of the electrocardiographic signal drifts 1 millivolt, making the electrocardiographic data marginal for purposes of medical analysis. Such a drift provides a 1 volt input signal to operational amplifier 88 and a 4 volt output signal to diode band 42. Depending on the polarity of the input signal, operational amplifier 116 or 118 is employed, at unity gain, to provide a 4 volt signal to conductor 124 and meter 24, driving the meter to half scale or to a "Marginal" reading. Switch 29 is held closed for 5 seconds to ascertain the amount of drift over that period of time. With base line drift, needle 26 slowly moves into the "Marginal" or "Bad" sectors of meter 24. This slow deflection indicates to the technician that a base line artifact is present.

Base line drift greater than 1 millivolt in 5 seconds deflects meter 24 to a "Bad" reading during that time.

In the Presence of A.C. Artifacts

The operation of artifact detector 22 in connection with artifacts exhibiting periodic or a.c. characteristics is as follows. A 30 Hz sine wave artifact is initially used for exemplary purposes since the operation of artifact detector 22 in connection with both muscle tremor and 50/60 Hz interference artifacts may be illustrated by such a signal. It will be appreciated that, in actuality, a.c. artifact signals may not be sinusoidal and may not be symmetrical about a neutral axis. output It may be assumed that the 30 Hz artifact signal has a 0.25 millivolts peak to peak magnitude at the patient, substantially in excess of the 0.1 millivolts limit established by artifact detector 22. The 30 Hz 0.25 millivolt signal is amplified by amplification circuitry 14 and provided to a.c. detector section 50. Inasmuch as the magnitude of the amplified signal is such as to drive amplifier 60 into saturation, output signal 200 of a.c. detector section 50 in conductor 86 is the generally sinusoidal signal clipped by the saturation of amplifier 60, shown in FIG. 4a having a 16 volt peak to peak magnitude. Signal 200 is applied to diode bridge 42 in conductors 100 and 102. The positive half cycles are rectified and conducted through diode bank 42a to provide positive half wave signal 202 in conductor 108 having a magnitude of positive 8 volts. The negative half cycles are similarly treated to provide negative half cycle signal 204 in conductor 110. The filtering action of capacitors 112 and 114 provides input signals 206 and 208 to operational amplifier 116 and 118, respectively. See FIG. 4b.

Figure 4A:
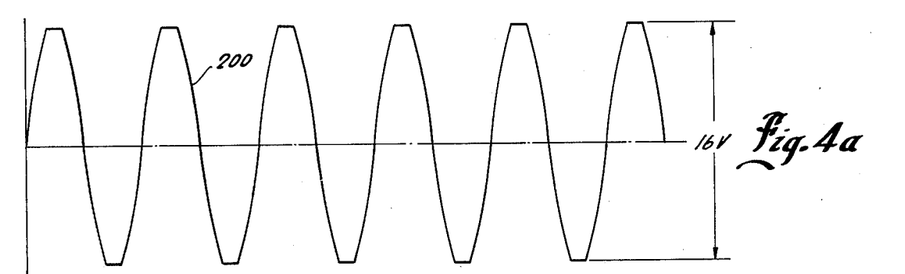
FIGS. 4a, b, and c are wave forms illustrating the operation of the artifact detector in the presence of an a.c. artifact.
Figure 4B:
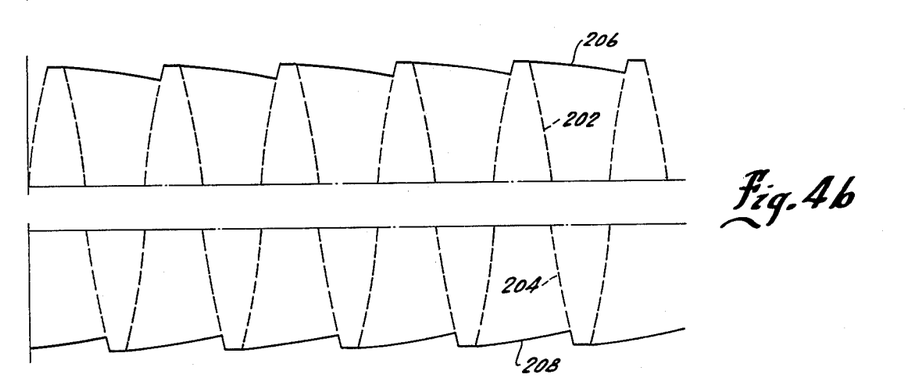
Figure 4C:
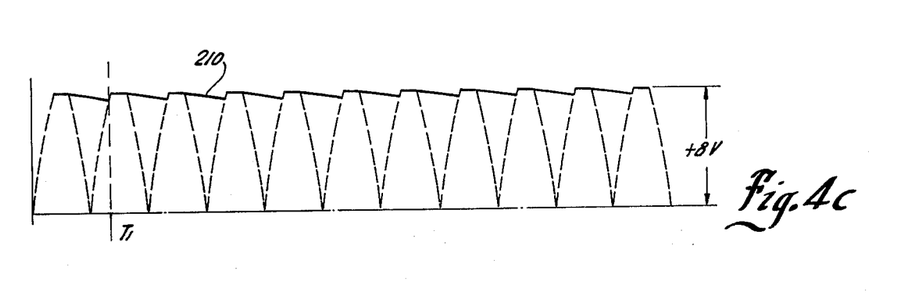

Signal 208 is inverted by amplifier 118. The signal at junction 123 is shown in FIG. 4c by the numeral 210. While signal 206 in conductor 119 reverse biases diode 122, preventing the application of signal 208 to junction 123, as soon as the magnitude of signal 208 in conductor 121 exceeds the magnitude of signal 206, as at time $T_1$, diode 122 becomes conducting and diode 120 is reversed biased. The signal in junction 123 and conductor 124 is +8 volts. The signal at junction 127 is the same as signal 210 plus any additional smoothing provided by resistor 126 and capacitor 127.

The signal at junction 127 and in conductor 130 provides full scale deflection of meter 24, as noted in connection with the electrode off artifact discussed above, giving a "Bad" reading on the scale of meter 24.

A.C. artifact signals of lesser magnitudes provides lesser magnitude signals in conductor 124 and 130 and smaller deflection of meter 24. The slight flicker to needle 26 caused by the rectified nature of signal 210 indicates to the technician that an a.c. artifact is present.

In the Presence of Multiple Artifacts

FIG. 5 shows the operation of artifact detector 22 when a.c. and d.c. artifact phenomena are simultaneously present. FIG. 5 illustrates a situation in which a 1.5 millivolt d.c. artifact, for example, base line drift, is present and a 0.1 millivolt 30 Hz a.c. artifact is also present. Artifact detector 22 must respond to the d.c. artifact which is in excess of the 1 millivolt maximum drift level.

Figure 5A:
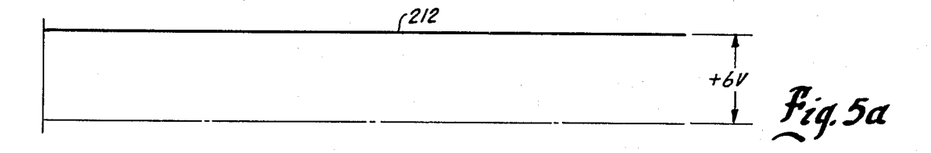
FIGS. 5a, b, c, and d are wave forms illustrating the operation of the artifact detector when both a.c. and d.c. artifacts are present.

The 1.5 millivolt d.c. artifact provides a 6 volts positive output signal 212 in conductor 98, as shown in FIG. 5a. The signal in conductor 98 is provided to positive diode bank 42a by conductor 104.

Figure 5B:
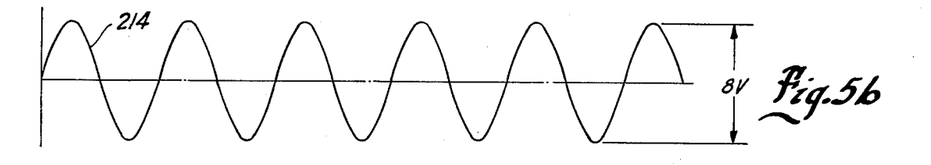
Figure 5C:
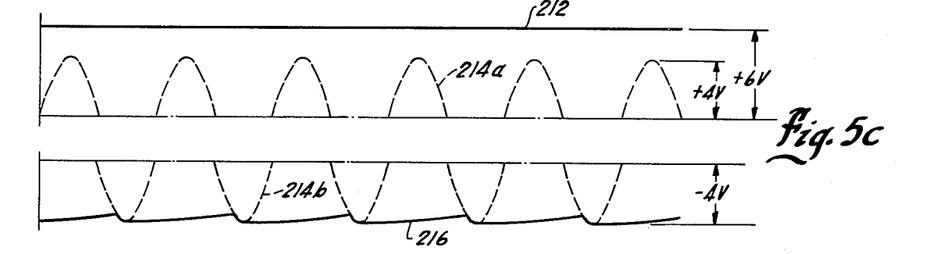
Figure 5D:
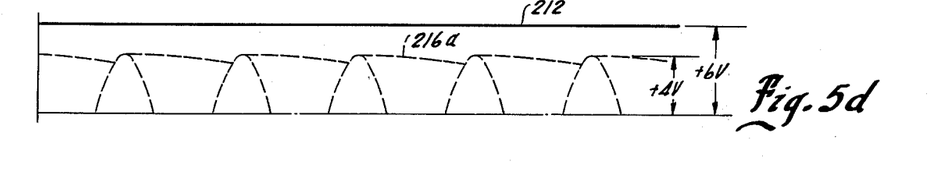

The 0.1 millivolt a.c. artifact signal provides an 8 volt peak to peak voltage signal 214 in conductor 86, as shown in FIG. 5b. The a.c. signal in conductor 86 is provided to positive diode bank 42a in conductor 100 and to negative diode bank 42b in conductor 102. The 6 volts signal in conductor 104 reverse biases the diode in conductor 100 inasmuch as the maximum positive signal in conductor 100 is 4 volts. This prevents further application of the positive half cycles 214a of the a.c. detector section output signal. See FIG. 5c. The 6 volts signal in conductor 104 is provided in conductor 108 to operational amplifier 116 to provide a 6 volts output signal 212 from the amplifier in conductor 119.

The negative half cycles 214b of signal 214 in conductors 86 and 102 passes through negative diode bank 42b to conductor 110 and is smoothed by capacitor 114 to provide signal 216. Signal 216 is inverted by operational amplifier 118 to provide a positive 4 volts output signal 216a.

The 6 volts output signal 212 of operational amplifier 116 reverse biases diode 122 in the output of operational amplifier 118, inasmuch as the output signal of operational amplifier 118 does not exceed 4 volts. This blocks the output of operational amplifier 116. See FIG. 5d. The +6 volts output signal provided to conductors 124 and 130 deflects meter 24 into the "Bad" potion of the meter scale. Artiface detector 22 thus responds to the output of d.c. detector section 52 to provide the necessary meter deflection.

In the event the a.c. artifact is at or above the critical level and the d.c. artifact is below the critical level, artifact detector 22 responds to the output signal in conductor 86. The magnitude of this signal, when the a.c. artifact is at or above the critical level, is such as to cause diode bank 42 to block the lesser magnitude d.c.

artifact detector section signal in conductor 98 so that the operation of the remaining portions of artifact detector circuitry 22 resembles that described above in connection with FIG. 4. The smoothing provided by capacitors 112 and 114 prevents the artifact detector from responding to d.c. artifact signal levels between the half cycles of a.c. artifact signals.

It will be appreciated that the simultaneous appearance of both a.c. and d.c. artifacts may arise either in the same channel of electrocardiograph 10 or in different channels and that the parallel connection of artifact detection circuits 40a, b, and c to diode bank 42 mixes the signals from the artifact detection circuits.

FIG. 6 shows the operation of artifact detector 22 under conditions in which two a.c. artifact signals are present in the electrocardiographic data. It may be assumed that a 0.05 millivolt peak to peak 60 Hz artifact signal appears in one patient lead and a 0.075 millivolt peak to peak 30 Hz artifact signal appears in another patient lead to provide a 0.05 volt signal in conductor 18a and a 0.075 volt signal in conductor 18b, respectively. The 0.05 volt 60 Hz signal is amplified by d.c. detector section 50 of artifact detection circuitry 40a to provide a 4 volt signal 218 (see FIG. 6a) in conductor 86 for provision to positive diode bank 42a and negative diode bank 42b in conductors 100 and 102, respectively. The 0.075 volt 30 Hz artifact signal in conductor 18b is amplified by the a.c. detector section 50 of artifact detection circuitry 40b to a 6 volt signal 220 (see FIG. 6b) in conductor 87 for provision to positive diode bridge 42a in conductor 101 and negative diode bridge 42b in conductor 103.

Figure 6A:
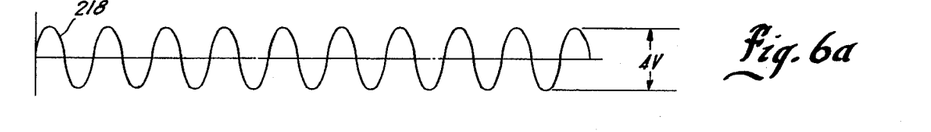
FIGS. 6a, b, c, and d are wave forms illustrating the operation of the artifact detector in the presence of two a.c. artifacts of different magnitudes and frequencies.
Figure 6B:
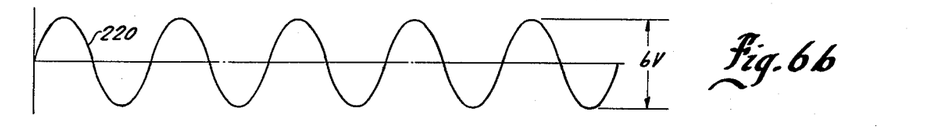
Figure 6C:
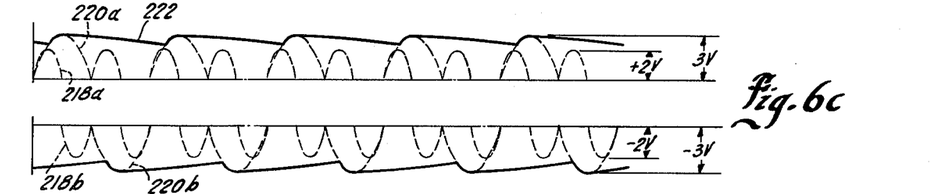

The operation of diode bank 42 is shown in FIG. 6c. In positive diode band 42a, the 3 volt artifact signal 220a in conductor 101 reverse biases the diode in conductor 100 when signal 220a and signal 218a from artifact detection circuitry 40a are simultaneously present so that only signal 220a is provided in conductor 108. The smoothing provided by capacitor 112 retains the reverse bias on the diode in conductor 100 so that signal 222 is provided to the input of operational amplifier 116. Signal 218a is blocked by the reverse bias on the diode in conductor 100. Similar operation occurs in connection with negative diode bank 42b. The signal 200b in conductor 103, when smoothed by capacitor 114, reverse biases the diode in conductor 102, blocking signal 218b from artifact detection circuit 40a. The smoothing provided by capacitors 112 and 114 prevents the artifact detector from responding to smaller magnitude a.c, artifact signal levels between the half cycles of the largest a.c. signal.

Figure 6D:
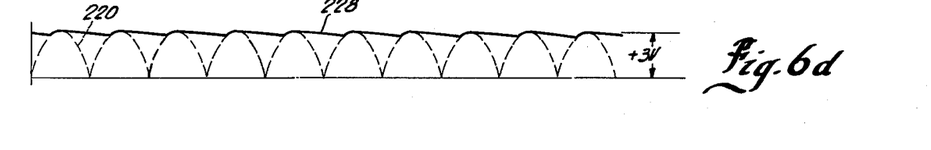

The output signals of operational amplifiers 116 and 118 are combined at junction 123 in the manner described in connection with FIG. 4c to provide 3 volt signal 228 to conductors 124 and 130. See FIG. 6d. The 3 volt signal causes meter 24 to deflect toward a "Bad" reading.

Without the presence of the R - C timing circuit comprised of resistor 156 and capacitor 158 in differential amplifier circuit 146–160, undesirable upscale deflection of meter 24 may occur, when a.c. artifacts are present and particularly at the beginning and the end of the QRS complex signals. This is due to the operation of differential amplifier circuitry 146–160. FIGS. 7a through f show the generation of this undesirable meter deflection and the manner in which it is overcome by the timing circuit. In the example shown in FIG. 7, a 0.1 millivolt a.c. artifact signal is assumed to be present so that meter 24 must provide a "Marginal" indication of the quality of the electrocardiographic data.

Figure 7A:
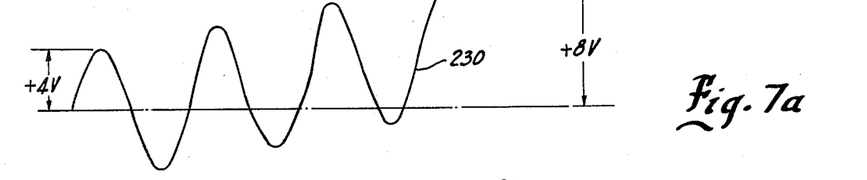
FIGS. 7a, b, c, d, e, and f are wave forms illustrating the operation of the artifact detector in connection with a QRS complex signal and with an a.c. artifact present.

FIG. 7a shows conditions at the output of a.c. artifact detector section 50 at the beginning of a QRS complex signal. The QRS complex signal is typically 10 to 15 times larger and 20 to 30 times lower in frequency than the a.c. artifacts. As the QRS signal is applied to the artifact detector section, the a.c. artifact signal rides up on the increasing QRS signal 230 shown in FIG. 7a. Due to the clipping action obtained by the saturation of operational amplifier 60, the output signal in conductor 86 is as shown in FIG. 7a.

Figure 7B:
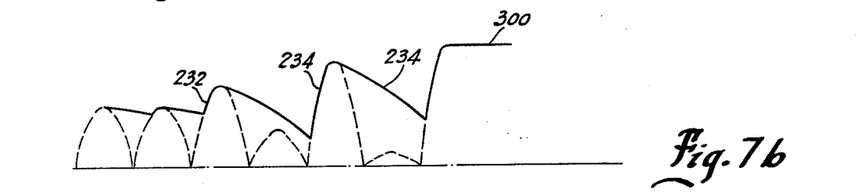

Amplifier 60 provides a saturated output of +8 volts. The positive portion of the those in conductor 86 is passed through positive diode bank 42a while the negative portion passed through negative diode bank 42b. The positive and negative portions are smoothed by capacitors 112 and 114. The combined output signals of amplifiers 116 and 118 at junction 123 and in conductor 124 is shown in FIG. 7b as signal 232. It will be noted that there are pronounced voltage half cycles decreases 234 in signal 232 prior to amplifier 60 being driven into saturation by the QRS complex to provide signal 300 previously noted in connection with FIG. 3. The voltage decreases are shown in exaggerated form in FIG. 7b and occur because of the decreasing magnitude of the negative portion of signal 230. More specifically, as the voltage resulting from the QRS complex increases, the effect is that of an a.c. voltage (the artifact signal) riding upon a d.c. voltge (the QRS complex signal). When this occurs, diode bank 42a conducts for a longer period than diode bank 42b. The resultant voltage signal in conductor 124 is no longer a symmetrical half wave rectified, filtered, sine wave. Alternate half cycles will increase in magnitude while the remaining half cycles will decrease, causing voltage decreases 234. Eventually, the positive halfcycles increase to saturation causing the signal in conductor 124 to increase to the limiting value 300.

Figure 7C:
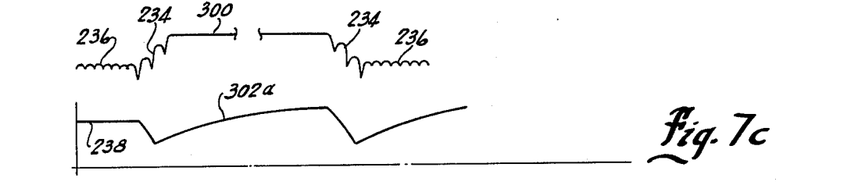

The same voltage decreases occur at the end of the QRS complex signal for reasons analogous to thos shown in FIGS. 7a and b, as the greater QRS complex voltage returns to the lower a.c. artifact signal level. FIGS. 7c and d show these voltage decreases, hereinafter termed notches 234, existing between the a.c. artifact signal level 236 and the QRS complex voltage 300 on a greatly contracted time scale.

Notches 234 in the signal in conductor 124 would be of no consequence were it not for the quick discharge, slow charge circuit comprised of resistor 126 and differential amplifier circuitry 146–160. When even a slight decrease in the signal in conductor 124 occurs, this circuitry discharges capacitor 128 to that lower level and then allows it to recharge slowly to the signal level in conductor 124. This causes an abnormal lessening of the signal 238 in conductor 130, as shown diagrammatically in FIG. 7c.

Specifically, the reduced voltage notch 234 when applied to capacitor 128 causes the capacitor to discharge, reversing the voltage polarity of resistor 126 and the polarity of the output voltage 246 of differential amplifier 146 from −12 volts to +12 volts. Were it not for the timing circuitry comprised of resistor 156 and capacitor 158, the reversed output polarity of differential amplifier 146 would operate differential amplifier 160 to discharge capacitor 128 to the voltage level at the bottom of notch 234. After the decreased voltage notch 234 passes, capacitor 128 would again commence charging, but from the discharged condition rather than from a condition more closely resembling a direct transistion from voltage level 236 to level 300. The result would be signal 302a which is less than a direct transistion approximation signal. Because of the reduction of the signal to meter 24, the presence of the a.c. artifact generating signal 236 may not be indicated by the position of needle 26 on the scale of meter 24. Adjustment of the gain of amplifier 136 is not satisfactory because of the effect on other operating modes of artifact detector 22 and for other reasons.

A similar discharge of capacitor 128 occurs at the end of the QRS complex signal which further reduces the signal in conductor 130.

To avoid the generation of signals 238 and 302a, the timing circuit comprised of resistor 156 and capacitor 158 prevents discharge of capacitor 128 at the beginning of the QRS complex signal but permits such discharge at the end of the QRS complex. It also prevents discharge of capacitor 128 by the half cycles of signal 236, raising the level of a.c. artifact signal in conductor 130 as to that of signal 238a in FIG. 7d and improving the artifact indication in meter 24.

The operation of the timing circuit is as follows.

At the commencement of the notch 234 occurring at the beginning of the QRS complex signal, capacitor 128 discharges and the voltage polarity of resistor 126 reverses due to the decreased voltage of the signal in conductor 124. The output signal 240 of differential amplifier 146 is reversed to +12 volts. See FIG. 7e. Capacitor 158 which has been previously uncharged, commences to charge the current applied through resistor 156. The potential on the upper plate of capacitor 158 rises from −12 volts toward zero. The magnitude of resistor 156 and capacitor 158 are selected so that the time interval required to provide a slightly positive voltage on the upper plate of capacitor 158 and reverse the polarity of the output signal of differential amplifier 160 is in excess of the period of decreased voltage notch 234 so that the input voltage of differential amplifier 146 reverses to the original condition at the conclusion of notch 234 before any reversal of input polarities to differential amplifier 160 can occur. The output condition of differential amplifier 160 is unchanged preventing operation of differential amplifier 160 and the discharge of capacitor 128. The signal in conductor 130 includes a slight decline produced by the discharge of capacitor 128 through resistor 126 and thereafter the increase 302 produced by the charging of capacitor 128 by the QRS complex signal, as described above, and as shown in FIG. 3. The increased signal 302 to meter 24 caused by the QRS complex signal results in a transient deflection of needle 26 from the "Marginal" condition established by signal 238a toward "Bad". This confirms to the technician the questionable quality of the electrocardiographic data.

Figure 7D:
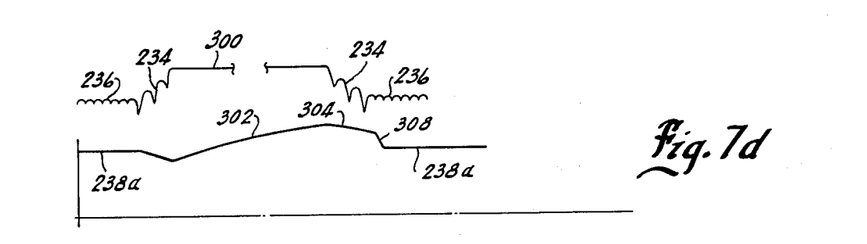
Figure 7E:
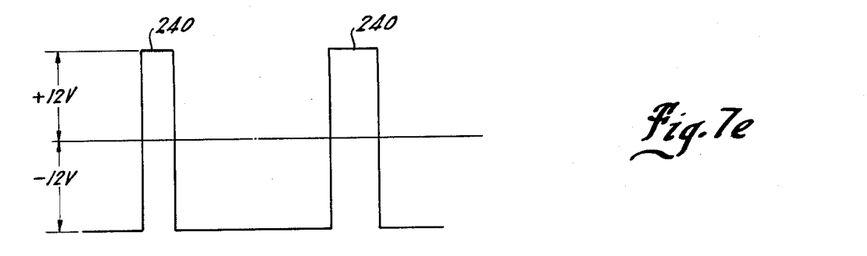
Figure 7F:
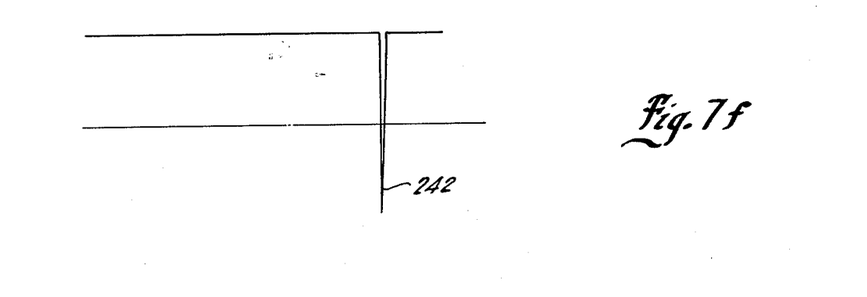

At the end of a QRS complex, signal 300 in conductor 124 terminates a second notch 234. The end of the QRS complex signal causes capacitor 128 to commence to discharge along the characteristic 304. The output signal 240 of differential amplifier 146 now changes to +12 volts due to the reversal of the input voltage across resistor 126, as shown in FIG. 7e. Capacitor 158 commences to charge by the current supplied through resistor 156. The potential on the upper plate of capacitor 158 rises from −12 volts toward zero. The discharge of capacitor 128 continues, inasmuch as the voltage levels of notch 234 and a.c. artifact signal 236 are less than the capacitor voltage. When the voltage on the upper plate of capacitor 158 becomes slightly positive, the polarity of the input signal of differential amplifier 160 reverses. This reverses the polarity of the output signal 242 of differential amplifier 160, see FIG. 7f, placing it at −12 volts potential and rendering diode 168 conductive so that a low resistance discharge path for capacitor 128 is provided through conductor 130, diode 164, differential amplifier 160 to ground. The discharge of capacitor 128 along the characteristic 308 of FIG. 3 rapidly decreases the signal in conductor 130 to that of signal 238a, as shown in FIG. 7d. The discharge of capacitor 128 also returns the voltage polarity of resistor 126 to the original condition restoring differential amplifier circuitry 146–160 to the original condition. The R - C timing circuit 156–158 thus prevents the undesirable discharge of capacitor 128 by voltage notches 234 and retains the signal to meter 24 at a level closely approximating the artifact condition of the electrocardiographic data.

Various modes of carrying out the invention are contemplated as being within the scope of the following claims particularly pointing out and distinctly claiming the subject matter which is regarded as the invention.

We claim:

1. An artifact detector for detecting periodic artifacts in an electrocardiographic signal, said artifacts being greater in frequency and smaller in magnitude than the periodically occurring major features of the electrocardiographic signal produced by the functioning of the heart, said artifact detector comprising:

detection circuitry including a saturable amplifier having an input for connection to a source of electrocardiographic signals and an output, the gain of said amplifier being controllable for driving said amplifier into saturation at preselected input signal levels to clip the tops of the major features of the electrocardiographic signal, and a band pass filter coupled to the output of said amplifier, said band pass filter having frequency response characteristic suitable for transmitting signals having frequencies of the artifacts, said detection circuitry having an output providing a periodic signal corresponding to the artifacts;

conversion means coupled to said detection circuitry for converting said periodic signal to a unipolarity signal having a magnitude determined by the magnitude of the periodic signal;

signal responsive indicator means for indicating the presence and magnitude of artifacts in the electrocardiographic signal; and indicator means driver circuitry coupled to said conversion means and to said indicator means for receiving the unipolarity signal of the conversion means and for providing a driving signal therefrom for said indicator means, said driver circuitry including capacitive means responsive to and chargable by the unipolarity signal for smoothing the unipolarity signal and reducing alterations in the driving signal when said amplifier is driven into saturation by the major features of the electrocardiographic signal, said driver circuitry including means for rapidly discharging said capacitive means at the conclusion of the major features of the electrocardiographic signal.

2. The artifact detector of claim 1 wherein said conversion means includes a pair of diode means connected in parallel between said detection circuitry and said indicator means driver circuitry and includes signal inverting circuitry operatively associated with one of said diode means.

3. The artifact detector of claim 1 wherein said discharging means includes means for delaying the rapid discharge of said capacitive means.

4. The artifact detector of claim 3 wherein said driver circuitry includes a first discharge path for said capacitive means extending between said conversion means and said indicator means and a second, low resistance discharge path for said capacitive means and wherein said discharging means includes means for ascertaining whether said capacitive means is charging or is discharging in said first path and for providing an output signal indicative thereof and timing means operable by said ascertaining means output signal inproviding predetermined time delay and for coupling said dicative of the discharging condition of the capacitive means for providing a predetermined time delay and for coupling said capacitive means to said low resistance discharge path at the end of said time delay for rapidly discharging said capacitive means.

5. The artifact detector of claim 1 suitable for detecting artifacts in a plurality of electrocardiographic signals, said artifact detector including a plurality of detection circuitries as defined in claim 1, each having an amplifier input for connection to a source of electrocardiographic signals, the output signals of said detection circuitries being supplied in parallel to said conversion means, said conversion means including selection means for receiving said output signals, for splitting the periodic signals of said detection circuitries into positive and negative portion signals, and for providing a pair of output signals comprising the largest positive portion signal and the largest negative portion signal, said conversion means further including comparison means for receiving said signals and for providing the largest of the portion signals to said indicator means driver circuitry as the unipolarity signal.

6. The artifact detector of claim 5 wherein said conversion means includes signal smoothing means operatively associated with said comparison means for smoothing said positive and negative portion signals into signals of substantially constant magnitudes determined by the magnitudes of said positive and negative signals.

7. The artifact detector of claim 5 wherein said selection means includes positive and negative diode banks having oppositely poled diodes, each of said banks having a plurality of diodes connected in parallel and coupled to the outputs of said detection circuitries.

8. The artifact detector of claim 5 suitable for detecting artifacts exhibiting d.c. voltage levels in a plurality of electrocardiographic signals, said plurality of detection circuitries having second amplifiers, each of said amplifiers having an input for connection to a source of electrocardiographic signals and having a d.c. response for providing an output signal having a polarity characteristic and corresponding to the d.c. artifacts to an output of said amplifier, the output signals of said detection circuitries being supplied in parallel to said selection means of said conversion means, said selection means providing a pair of output signals to said comparison means, one of said signals comprising the largest of said second amplifier output signals and the portion signals having the same polarity as said second amplifier signals, the second of said signals comprising the largest of the other portion signals, said comparison means providing the largest of the output signals to said indicator means driving circuitry as the unipolarity signal.

9. The artifact detector of claim 1 for detecting artifacts exhibiting d.c. voltage levels in an electrocardiographic signal, said detection circuitry further including a second amplifier having an input for connection to the source of electrocardiographic signals and having a d.c. response for providing an output signal having a polarity characteristic and corresponding to the d.c. artifacts to an output of said amplifier, the output signals of said detection circuitry being supplied in parallel to said conversion means, said conversion means including selection means for receiving said output signals, for splitting the periodic output signal of said detection circuitry into positive and negative portion signals, and for providing a pair of output signals, one of the signals comprising the largest of the second amplifier output signal and the one of the portion signals having the same polarity as the second amplifier output signal, the second of the signals comprising the other of the portion signals, said conversion means further including comparison means for receiving said signals and for providing the largest of the output signals to said indicator means driver circuitry as the unipolarity signal.

10. The artifact detector of claim 9 wherein said selection means includes positive and negative diode banks having oppositely poled diodes, each of said banks having a plurality of diodes connected in parallel and coupled to the outputs of said detection circuitries.

11. The artifact detector of claim 1 wherein said indicator means comprises an electro-mechanical meter.

12. The artifact detector of claim 11 wherein said meter has a movable indicator displaceable along an associated scale oriented so as to have a right hand end and a left hand end, said meter being so coupled to said indicator means driver circuitry as to cause said meter to deflect from right to left upon energization by said unipolarity signal.

13. An artifact detector for detecting periodic artifacts in a plurality of electrocardiographic data, said artifacts having a frequency greater than the electrocardiographic signal produced by the functioning of the heart, said artifact detector comprising:

a plurality of detection circuitries, each including an amplifier having an input for connection to one of the sources of the electrocardiographic data and an output, and a band pass filter coupled to the output of said amplifier, said band pass filter having frequency response characteristics suitable for transmitting signals having frequencies of the artifacts, each of said detection circuitries having an output providing a periodic signal corresponding to the signal artifacts;

conversion means including selection means to which said outputs of said detection circuitries are coupled in parallel and including comparison means connected between said selection means and an output terminal, said selection means splitting the periodic signals of said detection circuitries into positive and negative portion signals having magnitudes determined by the magnitude of the periodic signals and providing the largest positive portion signal and the largest negative portion signal to said comparison means, said comparison means providing the largest of the portion signals as a unipolarity signal at said output terminal; and indicating means coupled to the output terminal of said conversion means and responsive to the magnitude of said unipolarity signal for indicating the presence and magnitude artifacts in the electrocardiographic data.

14. The artifact detector of claim 13 wherein said comparison means includes a pair of diode means connected in parallel between said selection means and said output terminal and includes signal inverting circuitry operatively associated with one of the said diode means.

15. The artifact detector of claim 13 wherein said conversion means includes signal smoothing means operatively associated with said comparison means for smoothing said positive and negative portion signals into signals of substantially constant magnitudes determined by the magnitude of said positive and negative signals.

16. The artifact detector of claim 13 wherein said selection means includes positive and negative diodes blanks having oppositely poled diodes, each of said banks having a plurality of diodes connected in parallel and coupled to the plurality of diodes connected in parallel and coupled to the outputs of said detection circuitries.

17. The artifact detector of claim 13 suitable for detecting artifacts exhibiting d.c. voltage levels in a plurality of electrocardiographic data, said plurality of detection circuitries having second amplifiers, each of said amplifiers having an input for connection to a source of electrocardiographic data and having a d.c. response for providing an output signal having a polarity characteristic and corresponding to the d.c. artifact to an output of said amplifiers, said outputs signals of said detection circuitries being supplied in parallel to said selection means of said conversion means, said selection means providing an input signal to said comparison means, one of said signals comprising the largest of said second amplifier output signals and the portion signals having the same polarity as said second amplifier signals, the second of said signals comprising the largest of the other portion signals, said comparison means providing the largest of the input signals as said unipolarity signal to said indicator means driver circuitry as the unipolarity signal.

* * * * *